United States Patent
He et al.

(10) Patent No.: US 11,216,610 B2
(45) Date of Patent: Jan. 4, 2022

(54) GENERATING A GRAPHICAL USER INTERFACE BASED ON FORMATTED STRUCTURE DATA

(71) Applicant: Advanced New Technologies Co., Ltd., George Town (KY)

(72) Inventors: Sanyuan He, Hangzhou (CN); Junxue Rao, Hanzhou (CN); Fei Wang, Hangzhou (CN); Yuedong Weng, Hangzhou (CN); Deliang Zhu, Hangzhou (CN); Xi Sun, Hangzhou (CN); Xuelong Wen, Hangzhou (CN); Wenting Xu, Hangzhou (CN); Rui Chen, Hangzhou (CN); Jiangbo Xi, Hangzhou (CN); Xufeng Deng, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 49 days.

(21) Appl. No.: 16/019,716

(22) Filed: Jun. 27, 2018

(65) Prior Publication Data

US 2018/0307465 A1  Oct. 25, 2018

Related U.S. Application Data

(63) Continuation of application No. PCT/CN2016/110259, filed on Dec. 16, 2016.

(30) Foreign Application Priority Data

Dec. 30, 2015 (CN) .......................... 201511021196.3

(51) Int. Cl.
*G06F 40/143* (2020.01)
*H04L 29/08* (2006.01)
(Continued)

(52) U.S. Cl.
CPC .............. *G06F 40/143* (2020.01); *G06F 8/38* (2013.01); *G06F 8/65* (2013.01); *G06F 9/451* (2018.02);
(Continued)

(58) Field of Classification Search
CPC .... G06F 3/048; G06F 8/38; G06F 8/65–8/66; G06F 8/658; G06F 16/08; G06F 16/95;
(Continued)

(56) References Cited

U.S. PATENT DOCUMENTS 8,839,126 B1 *  9/2014  Tang .................... G06F 21/51
                                                      715/764
2006/0168536 A1   7/2006  Portmann
(Continued)

FOREIGN PATENT DOCUMENTS

CN    1799026      7/2006
CN    101403967    4/2009
(Continued)

OTHER PUBLICATIONS

Koch, Peter-Paul. The AJAX Response: XML, HTML, or JSON?—QuirksBlog. QuirksMode.org, Dec. 17, 2005, https://www.quirksmode.org/blog/archives/2005/12/the_ajax_respon.html. (Year: 2005).*
(Continued)

*Primary Examiner* — Liang Y Li
(74) *Attorney, Agent, or Firm* — Fish & Richardson P.C.

(57) ABSTRACT

Methods, systems, and computer-readable storage media for generation of a unified view of the graphical user interface. Implementations include actions of receiving, from a server, structured data of an interface template that is generated by the server by parsing interface template data associated with the interface template. The interface template is identified based on an interface identifier included in the service data. A virtual view node for the widget is determined based on
(Continued)

the structured data. The widget is retrieved based on the location information associated with the virtual view node. A unified view of the graphical user interface is generated by rendering the widget with a plurality of widgets associated with the graphical user interface and is displayed on a display device.

10 Claims, 6 Drawing Sheets

(51) Int. Cl.
- *G06F 9/451* (2018.01)
- *G06F 40/186* (2020.01)
- *G06F 40/205* (2020.01)
- *G06F 8/38* (2018.01)
- *G06F 8/65* (2018.01)

(52) U.S. Cl.
CPC .......... *G06F 40/186* (2020.01); *G06F 40/205* (2020.01); *H04L 29/08* (2013.01)

(58) Field of Classification Search
CPC ........ G06F 16/957; G06F 9/451–9/452; G06F 40/205–40/226; G06F 40/14; G06F 40/186; H04L 29/08
See application file for complete search history.

(56) References Cited

U.S. PATENT DOCUMENTS

| | | |
|---|---|---|
| 2006/0206804 A1 | 9/2006 | Barnett |
| 2007/0208669 A1* | 9/2007 | Rivette ............... G06Q 50/184 705/59 |
| 2008/0104025 A1* | 5/2008 | Dharamshi ........... G06F 16/986 |
| 2008/0209396 A1 | 8/2008 | Ping et al. |
| 2009/0158142 A1* | 6/2009 | Arthursson ......... H04L 67/1095 715/255 |
| 2010/0281475 A1 | 11/2010 | Jain et al. |
| 2012/0331375 A1* | 12/2012 | Fanning ............... G06F 16/986 715/234 |
| 2013/0073946 A1* | 3/2013 | Kang .................... G06F 16/986 715/234 |
| 2014/0053063 A1 | 2/2014 | Cirrincione et al. |
| 2014/0108503 A1* | 4/2014 | Haykal .................. H04L 67/02 709/203 |
| 2014/0250067 A1* | 9/2014 | Calkowski ........... G06F 16/178 707/624 |

FOREIGN PATENT DOCUMENTS

| | | |
|---|---|---|
| CN | 104090749 | 10/2014 |
| CN | 104158836 | 11/2014 |
| CN | 104283924 | 1/2015 |
| CN | 104798036 | 7/2015 |
| JP | 2006526828 | 11/2006 |
| JP | 2011524030 | 8/2011 |
| WO | WO 2004109501 | 12/2004 |

OTHER PUBLICATIONS

Fu, Yupeng, et al. "Forward: Data-centric UIs using declarative templates that efficiently wrap third-party JavaScript components." Proceedings of the VLDB Endowment 7.13 (2014): 1649-1652. (Year: 2014).*

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

International Search Report by the International Searching Authority issued in International Application No. PCT/CN2016/110259 dated Mar. 17, 2017; 8 pages.

European Extended Search Report in European Application No. 16880972.1, dated Nov. 26, 2018, 7 pages.

PCT International Preliminary Report on Patentability in International Application No. PCT/CN2016/110259, dated Jul. 3, 2018, 8 pages (with English translation).

* cited by examiner

GENERATING A GRAPHICAL USER INTERFACE BASED ON FORMATTED STRUCTURE DATA

This application is a continuation of PCT Application No. PCT/CN2016/110259, filed on Dec. 16, 2016, which claims priority to Chinese Patent Application No. 201511021196.3, filed on Dec. 30, 2015, and each application is hereby incorporated by reference in its entirety.

TECHNICAL FIELD

The present application relates to data presenting technologies, and in particular, to an interface data presenting method and device.

BACKGROUND

An interface framework of a client application is usually written by native codes. The interface framework can remain unchanged after being set in advance based on service needs. The framework and style of each interface can be adapted to a corresponding service data structure. If the interface framework needs to be changed based on a change of service, or a new framework interface needs to be added to add new service data, the client application usually needs to be recompiled, re-downloaded, and re-installed. If a user does not update the client application, service data changes or additions cannot be presented to the user.

SUMMARY

The present application provides an interface data presenting method and device, so as to dynamically update a client application's interface.

According to a first aspect of an implementation of the present application, an interface data presenting method running on a client application is provided, where the method includes the following steps: parsing, to obtain a virtual view node, structured data that is of an interface template and that is delivered by a server, where the structured data of the interface template is generated by the server by parsing interface template data written in a general protocol markup language, and the interface template data includes a common tag for describing a widget; binding service data to the virtual view node; and calculating location information of the widget based on the virtual view node that the service data is bound to, and rendering a view based on the location information of the widget.

According to a second aspect of an implementation of the present application, an interface data presenting method running on a server is provided, where the method includes the following steps: parsing, to obtain structured data, interface template data written in a general protocol markup language, where the interface template data includes a common tag for describing a widget; and delivering the structured data to a client application, so that the client application renders the widget into a view.

According to a third aspect of an implementation of the present application, an interface data presenting device located on a client application is provided, and includes: a parsing engine module, configured to parse, to obtain a virtual view node, structured data that is of an interface template and that is delivered by a server, where the structured data of the interface template is generated by the server by parsing interface template data written in a general protocol markup language, and the interface template data includes a common tag for describing a widget; a binding module, configured to bind service data to the virtual view node; and a layout engine module, configured to calculate location information of the widget based on the virtual view node that the service data is bound to; and a rendering engine module, configured to render a view based on the location information of the widget.

According to a fourth aspect of an implementation of the present application, an interface data presenting device located on a server is provided, and includes: a parsing engine module, configured to parse, to obtain structured data, interface template data written in a general protocol markup language, where the interface template data includes a common tag for describing a widget; and a communications module, configured to deliver the structured data to a client application, so that the client application renders the widget into a view.

The present application implements the interface framework of the client application by using the interface template technology instead of native code, and correspondingly provides a solution for the client application to display the service data by using the interface template. As such, not only the interface can be updated without updating the client application, but also the server can parse the interface template data to obtain the structured data, so that developers can design the interface template in the general markup language. Therefore, the requirement for the developers to learn proprietary protocols can be eliminated, to make the solutions of the present application more universal.

DESCRIPTION OF EMBODIMENTS

Figure 1:
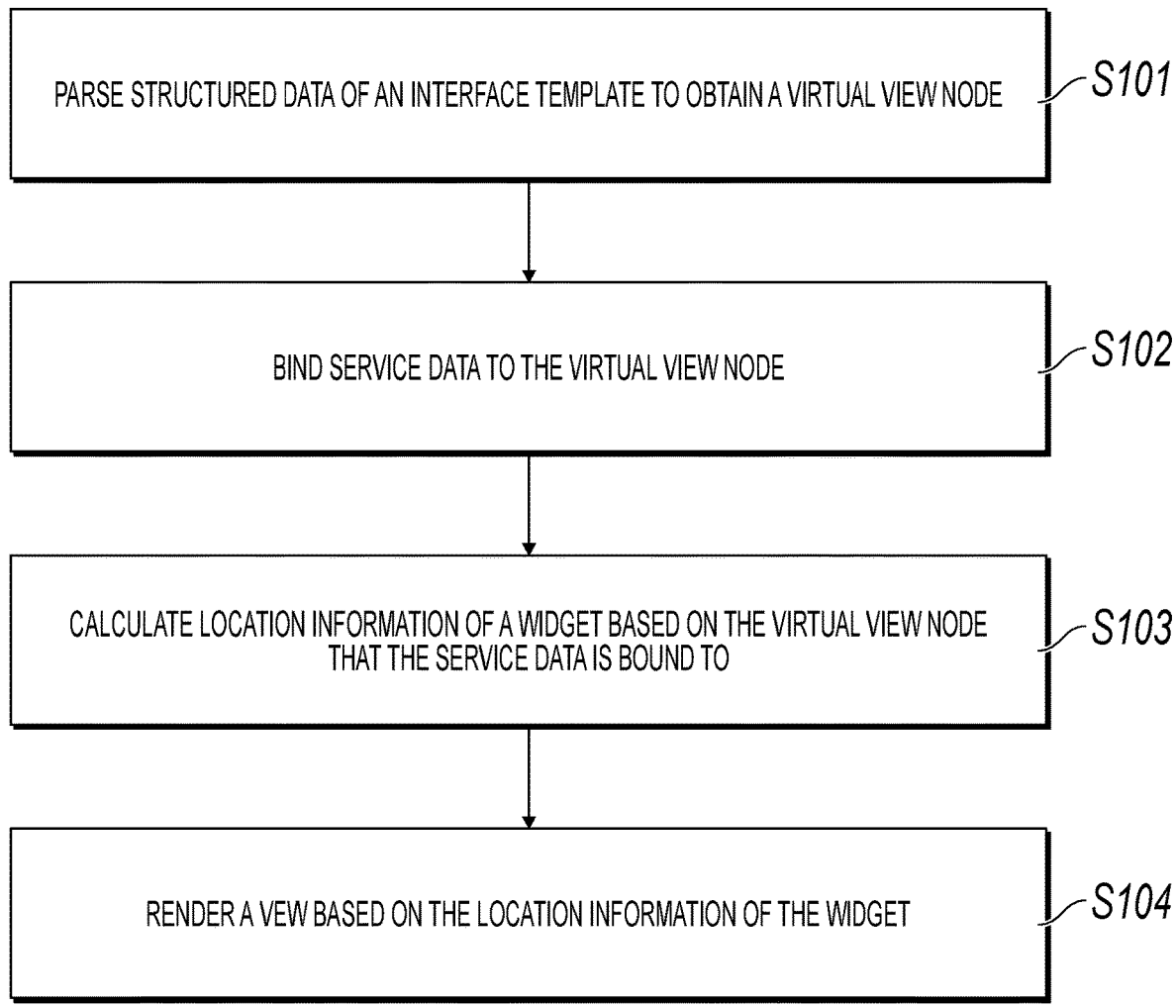
FIG. 1 is a flowchart illustrating an interface data presenting method, according to an implementation of the present application.

Example implementations are described in detail here, and are presented in the accompanying drawings. When the following description refers to the accompanying drawings, unless specified otherwise, same numbers in different accompanying drawings represent the same or similar elements. Implementations described in the following example implementations do not represent all implementations in accordance with the present application. On the contrary, they are only examples of devices and methods that are described in the appended claims in detail and that are in accordance with some aspects of the present application.

The terms used in the present application are merely used for the purpose of illustrating implementations, and are not intended to limit the present application. The terms "a", "said" and "the" of singular forms used in the present application and the appended claims are also intended to include plural forms, unless otherwise specified in the context. It should also be understood that, the term "and/or" used here indicates and includes any or all possible combinations of one or more associated listed items.

It should be understood that although the terms "first", "second", "third", etc. can be used in the present application to describe various information, the information is not limited by the terms. These terms are merely used to differentiate information of the same type. For example, without departing from the scope of the present application, first information can also be referred to as second information, and similarly the second information can also be referred to as the first information. Depending on the context, for example, words "if" used here can be explained as "while" or "when" or "in response to determining".

In the present application, an interface template can be separated from an client application, to help dynamically update the interface template, and allow an application developer to write the interface template based on a general protocol markup language. The client application can be loaded on various smart devices such as a mobile terminal, a tablet, or a computer. The solutions is not limited to a specific type of operating system on a smart device. For example, the operating system can be an iOS system, an Android system, a Windows system, an OS X system, etc. The general protocol markup language can be the HyperText Markup Language (HTML). Certainly, other languages specified in standard general protocols suitable to make an interface are not excluded.

The interface template in the present application can be an interface framework that includes layout relationship, display style, operation control logic of several common elements, but does not include service data. The interface template can be implemented by using HTML, Cascading Style Sheets (CSS), and Javascript (JS). The common element can include a common tag for interface template data in HTML source code. A widget is described by using the common tag, for example, a Body tag, a Div tag, a Title tag, a Label tag, and an Img tag. The common element can also include an element that presents a display style. The display style can be implemented by using CSS. The layout is specified by using CSS for an interface written in HTML. Certainly, other methods for specifying the interface layout are not excluded. JS can be used to control display content, display effects, layout relationship adjustment of the common tags, and to process user's operations.

After an interface template written by an application developer is configured on a server, the server converts interface template data into structured data of the interface template, and sends the structured data of the interface template to a client application. Referring to FIG. 1, after the client application receives the structured data, a work process can include the following steps:

S101. The client application parses the structured data of the interface template sent by the server to obtain a virtual view node.

S102. Bind service data to the virtual view node.

S103. Calculate location information of a widget based on the virtual view node that the service data is bound to.

S104. Render a view based on the location information of the widget.

A work process of the server can include a process of converting the interface template data, a process of distributing the structured data of the interface template, and a process of exchanging the service data with the client application.

To resolve the problem of poor parsing performance of HTML, before the server sends the interface template data to the client application, the server first parses the interface template data to obtain the structured data, and then sends the structured data to the client application, thereby the process of parsing the HTML by the client application can be avoided. Selected structured data can have a compact data structure that can directly express an object mode, such as a JSON format and an XML format. The JSON format is used as an example. The HTML can be parsed to obtain a document object mode (DOM). A DOM node stores related information of an HTML common tag. The DOM node describes a relative location of a widget in the interface, described by using the common tag. Because a syntax tree of the JSON format is simpler than a syntax tree of the HTML, the client application can parse data in the JSON format more efficiently than HTML data.

Each interface template has a unique interface identifier to distinguish between different interface templates. After the interface template data is parsed to obtain the structured data, the structured data is distributed by the server to the client application, so that the client application subsequently displays the service data by using the structured data. The structured data of the interface template includes an interface identifier.

A process of distributing an updated interface template to the client application can vary with different service scenarios. For example, after the interface template is updated, the server can actively distribute, to the client application, new structured data obtained by parsing the interface template, or can distribute the structured data to the client application as needed, etc.

A work process of the client application can include a process of parsing and storing the structured data of the interface template, a process of exchanging the service data with the server, a process of binding the service data to the interface template, and a process of rendering a view.

After the structured data of the interface template is sent by the server to the client application, the client application parses the structured data of the interface template to generate tree-structure virtual view nodes for storage. Each virtual view node can store basic information of a DOM node in the HTML, such as related information of the common tag, and can further include type information in the corresponding client application, information about a response event in the client application, etc. The location information of the widget described by using the HTML common tag can be calculated by using the virtual view node.

After a service data exchange procedure is triggered, the client application obtains the service data from the server, and the server can deliver a template identifier that corresponds to the service data to the client application when delivering the service data.

As an example, the process of binding the service data to the interface template can be implemented by using a JS script in a JS engine-driven interface template. The service data is processed by the JS engine. The JS engine executes the JS script to insert the service data into a corresponding virtual view node. For example, reference can be made to the following process: 1. If attributes and methods in native code (referred to as Native hereafter) of a device operating system (for example, an iOS system or an Android system) do not exist in the JS of the interface template, an interface of the JS engine can be extended, to bind the Native attributes and methods to the JS engine. The extended interface of the JS engine can include, for example, a JS entry function for receiving and processing the service data, or an interface of a rendering engine for calling Native. 2. The JS engine transmits the service data to the JS entry function. 3. The service data is inserted into the corresponding virtual view node by using the JS entry function.

In an example, the rendering engine can be instructed, by using the JS engine and the interface of the rendering engine for calling Native, to trigger the process of rendering the view. In the process, the client application can render the view by using a plurality of methods. For example, after location information of each widget is calculated, the widget can be rendered in a corresponding location of the view. In this case, an interface presenting effect is that widgets are presented to the user one by one. In another example, after location information of widgets in an entire view is calculated in a memory, the location information of the widgets can be fetched from the memory, the widgets are rendered together into the view, and the complete view is presented to the user, so that the time of view rendering can be greatly reduced.

There can be a process of updating the structured data of the interface template obtained by the client application from the server. Different implementation procedures for sending structured data of the updated interface template to the client application can be designed based on different service scenarios. For example, after updating the interface template, the server can actively push the structured data to the client application. Alternatively, after triggering a service procedure, the client application sends a request to the server when the service data needs to be presented by using a new interface template. Therefore, as an example, a process of asking for structured data of the new interface template from the server can include: After obtaining the service data from the server, the client application can search for the interface template that corresponds to the service data based on an interface identifier in the service data; and if no interface template is identified, request the structured data of the interface template that corresponds to the interface identifier from the server.

After receiving the updated structured data, the client application parses the structured data to obtain a virtual view node, and updates the related information stored in the virtual view node. The virtual view node is bound to the service data based on the updated information, and the virtual view node that the service data is bound to is passed to the rendering engine by using the interface of the rendering engine for calling Native, to redraw the view.

The following is an example of implementing the solution in an application scenario. In the application example, based on different functions, client applications are classified into a service client application and an interface client application, and servers are classified into a service server and an interface server. The service client application and the interface client application can be integrated into and loaded to a same App on a mobile terminal. The interface server includes an HTML parsing engine and an interface template management module. The interface client application includes an interface-template structured data parsing engine, a JS engine, a layout engine, and a rendering engine.

Figure 2:
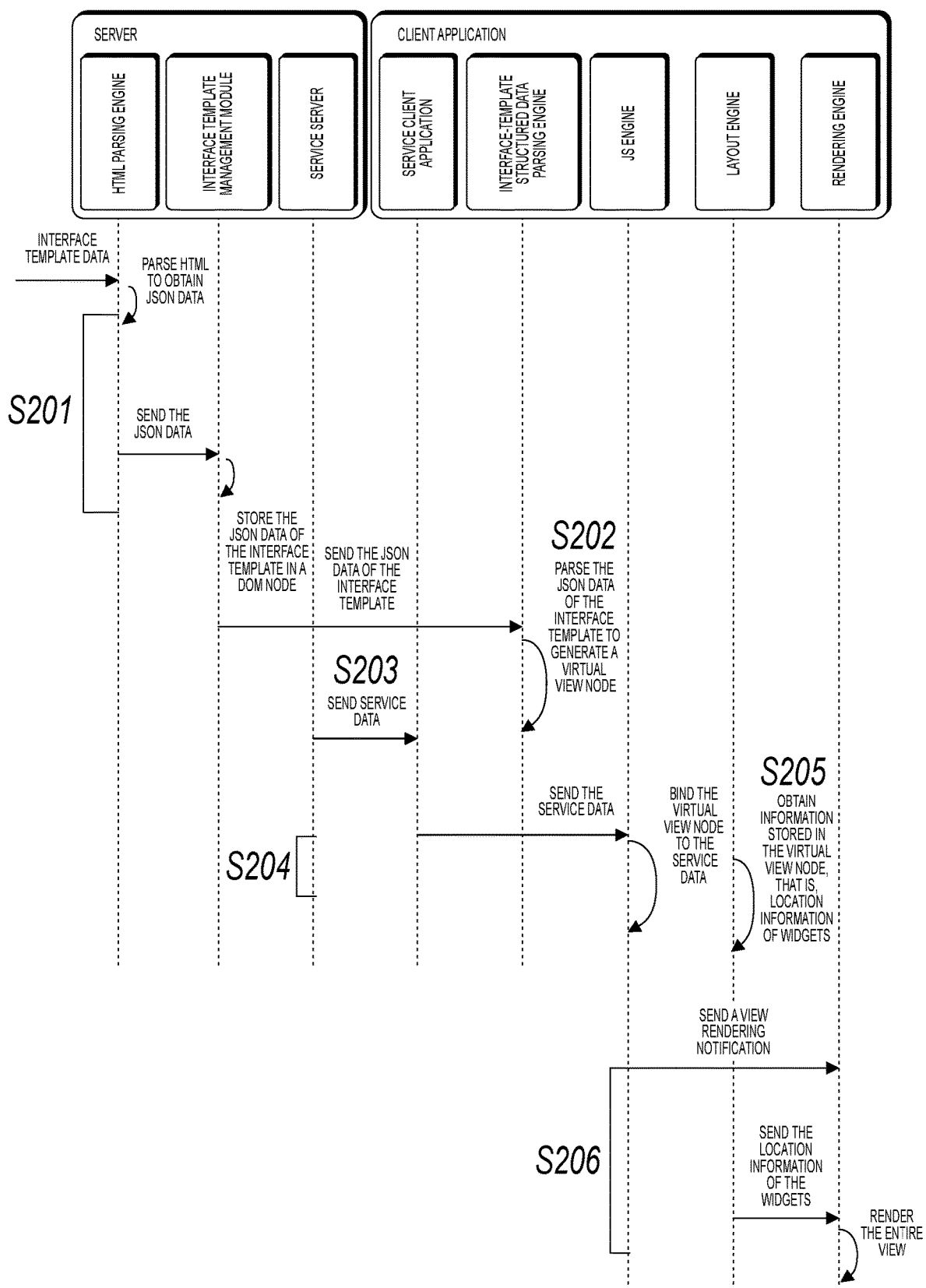
FIG. 2 is a diagram illustrating a timing sequence of information interaction in an application example, according to the present application.

Referring to FIG. 2, in step 201, the server preprocesses interface template data.

The server uses the HTML parsing engine to parse the interface template data to obtain structured data based on a JSON format. An HTML common tag in the interface template data, a CSS attribute associated with the common tag, and a JS script are parsed and then stored in a same JSON file of the interface template management module in a form of a DOM tree node. The interface template management module performs addition, deletion, or modification on these JSON files.

In step 202, the interface client application parses JSON data of the interface template.

After receiving the JSON data of the interface template, the interface client application uses the interface-template structured data parsing engine to parse the JSON data of the interface template to obtain the virtual view node. Information such as basic information of the DOM node of the interface template, type information in an application, and information about a response event in the application is stored in the virtual view node.

In step 203, the service client application exchanges service data with the service server.

The service client application sends a request to the service server to obtain the service data. The service server encapsulates the needed service data in a predetermined format and adds an ID of the interface template to send the service data in the form of JSON data to the service client application.

In step 204, the service data is bound to the virtual view node.

After receiving the service data, the service client application forwards the service data to the JS engine of the interface client application for processing. The JS engine of the interface client application searches for the JSON data of the corresponding interface template based on the interface template ID, and transmits the service data to a JS entry function of the interface template for processing. The JS entry function splits the service data and then inserts the service data into the corresponding virtual view node for binding. For example, service data related to a Body tag is bound to a virtual view node that stores the Body tag, and service data related to a Div tag is bound to a virtual view node that stores the Div tag.

In the present step, if no JSON data of a corresponding interface template is identified based on the interface template ID, the interface client application needs to request the JSON data of the interface template that corresponds to the interface template ID from the interface server again.

In step 205, the layout engine calculates a widget location.

The layout engine calculates a location of each widget by using information stored in each virtual view node, and stores the location information of each widget in a memory.

In step 206, a view is rendered.

In this example, after locations of widgets are calculated, when the view is rendered, the rendering engine is instructed, by using the JS engine, to perform view rendering. The view rendering engine obtains the calculated location of each widget in the entire view from the memory, and presents the complete view.

Corresponding to the implementation of the interface data presenting method, the present application further provides an implementation of an interface data presenting device.

Figure 3:
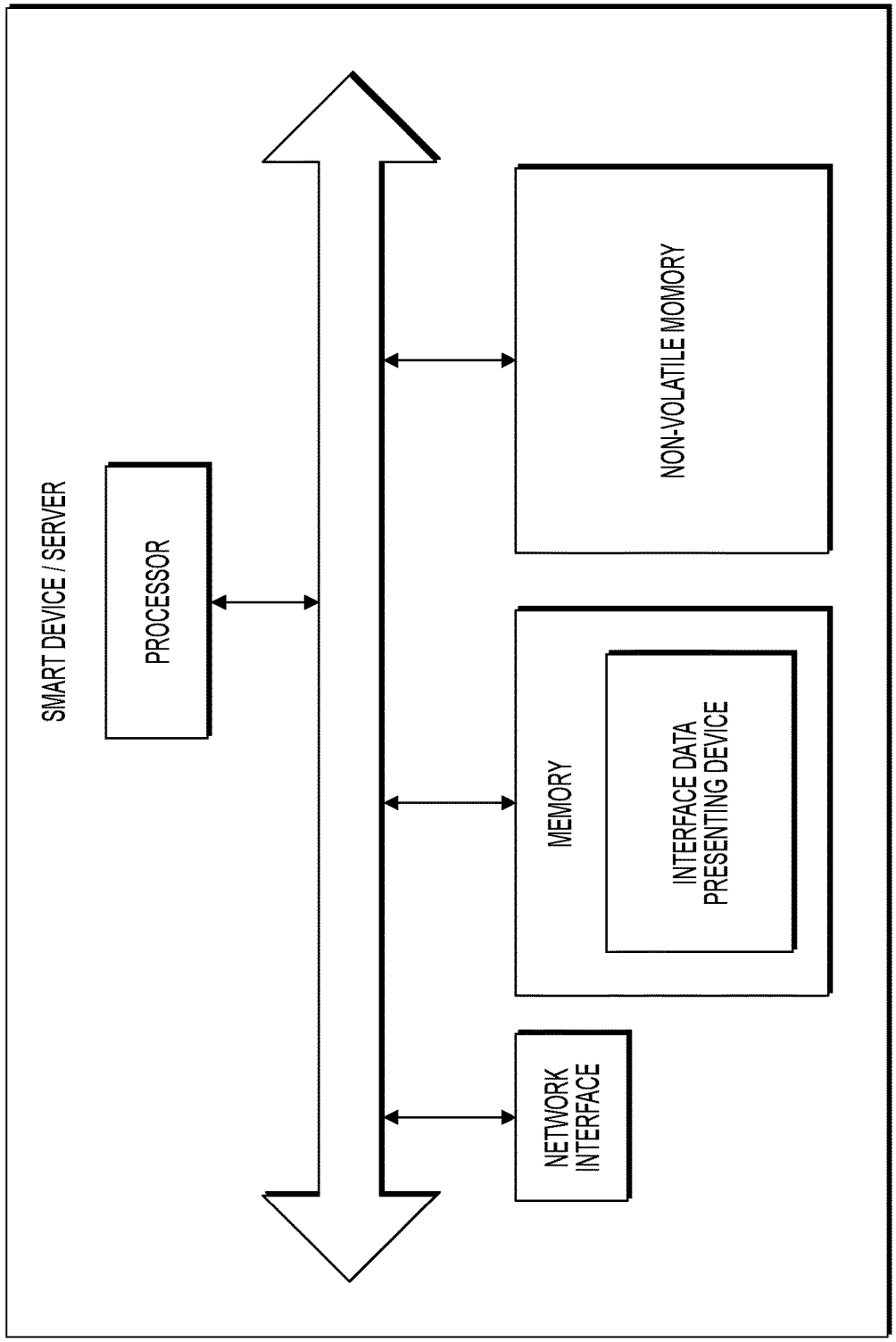
FIG. 3 is an architectural diagram illustrating hardware of an interface data presenting device, according to an implementation of the present application.

The implementation of the interface data presenting device in the present application can be applied to a smart terminal and a server. The device implementation can be implemented by using software, or can be implemented by using hardware or a combination of software and hardware. Software implementation is used as an example. As a logical device, the device is formed by reading a corresponding computer program instruction in a non-volatile memory to a memory by a processor of the smart terminal or the server where the device is located. From a hardware perspective, as shown in FIG. 3, FIG. 3 is a structural diagram illustrating hardware where a data presenting device in the present application is located. In addition to processor, memory, network interface, and non-volatile memory shown in FIG. 3, the smart terminal or the server where the device in this implementation is located can include other hardware based on actual functions of the smart terminal and the server. Details are not described here to avoid duplication.

Figure 4:
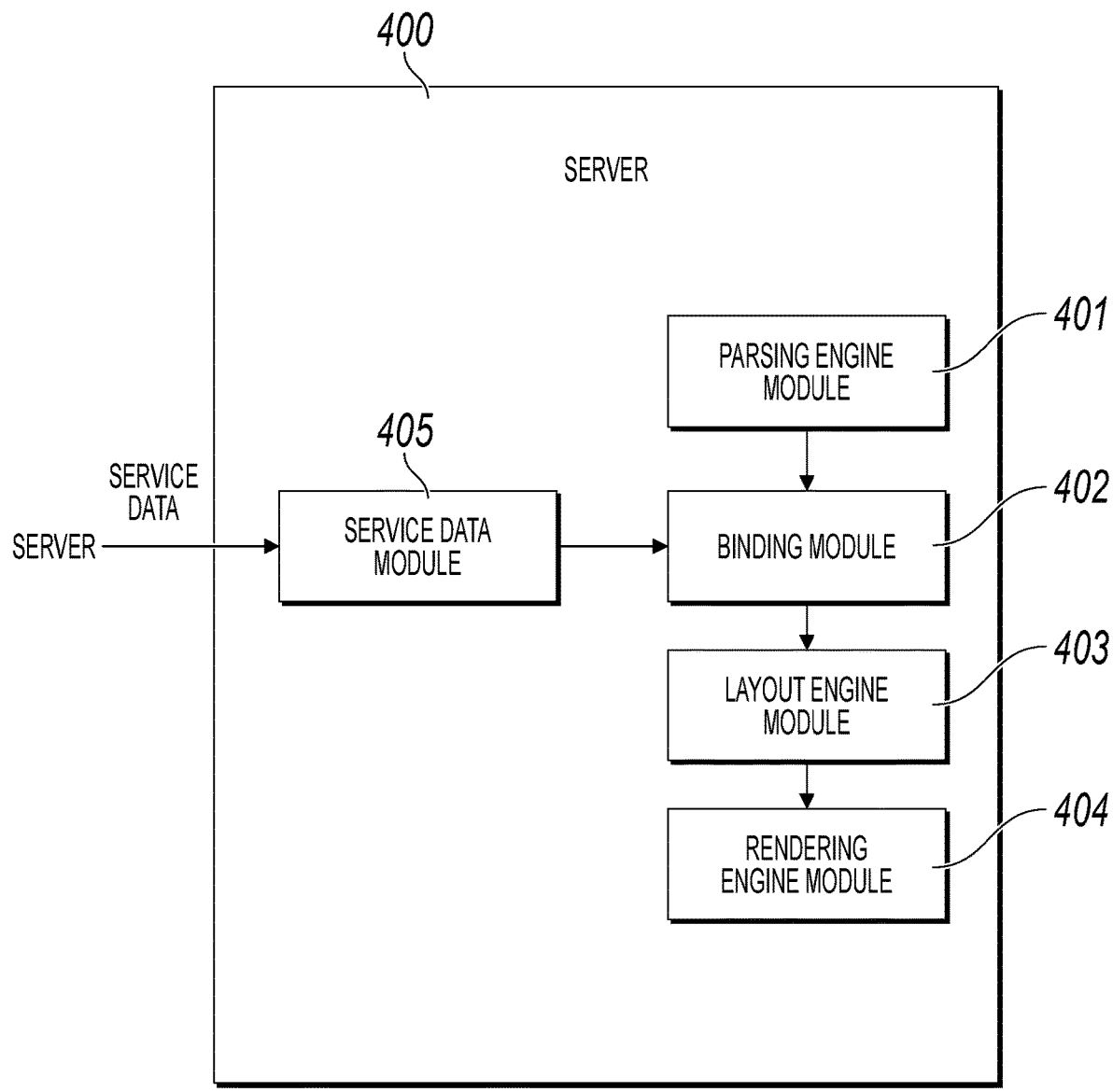
FIG. 4 is a software logic block diagram illustrating an interface data presenting device, according to an implementation of the present application.

Referring to FIG. 4, an interface data presenting device 400 can be located on a client application in an implementation, and include a parsing engine module 401, a binding module 402, a layout engine module 403, and a rendering engine module 404.

The parsing engine module 401 can be configured to parse, to obtain a virtual view node, structured data of an interface template sent by a server. The structured data of the interface template is generated by the server by parsing interface template data written in a general protocol markup language. The interface template data includes a common tag for describing a widget.

The binding module 402 can be configured to bind service data to the virtual view node.

The layout engine module 403 can be configured to calculate location information of the widget based on the virtual view node that the service data is bound to.

The rendering engine module 404 can be configured to render a view based on the location information of the widget. The general protocol markup language can be HTML, and the structured data can be JSON data or XML data.

Information stored in the virtual view node can include related information of the common tag, and/or type of the client application, and/or information about a response event in the client application.

The parsing engine module 401 can be further configured to instruct the virtual view node to update the stored related information after the client application receives structured data of an updated interface template.

In addition, a service data module 405 can be included, and is configured to receive the service data delivered by the server and send the service data to the parsing engine module 401, and request the service data from the server based on a notification from the parsing engine module 401.

The parsing engine module 401 can be further configured to send a notification to the service data module 405 when no structured data of an interface template that corresponds to the service data is identified.

That the rendering engine module 404 renders a view based on the location information of the widget includes: after the layout engine module 403 calculates location information of widgets, obtaining the location information of the widgets, and rendering the widgets into the view.

Figure 5:
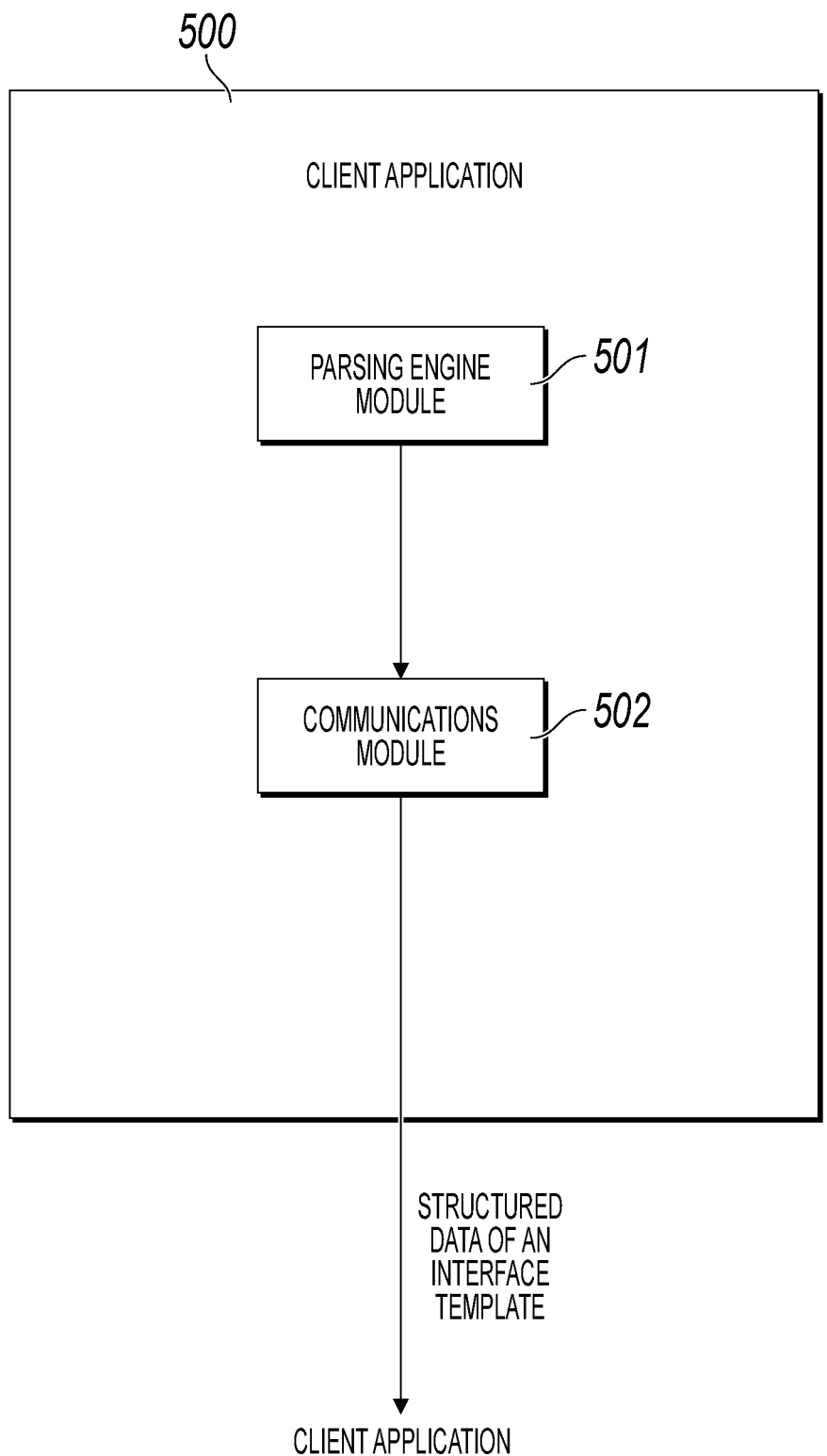
FIG. 5 is a software logic block diagram illustrating an interface data presenting device, according to another implementation of the present application.

FIG. 5 is an implementation of an interface data presenting device 500. The device 500 is located on a server side, and includes: a parsing engine module 501, configured to parse, to obtain structured data, interface template data written in a general protocol markup language, where the interface template data includes a common tag for describing a widget; and a communications module 502, configured to deliver the structured data to a client application, so that the client application renders the widget into a view.

The general protocol markup language can be HTML, the structured data can be JSON data, and the common tag can be stored in a DOM node for the JSON data.

For an implementation process of functions and roles of each unit in the device, reference can be made to an implementation process of a corresponding step in the foregoing method. Details are not described here for simplicity.

The apparatus implementation can correspond to the method implementation, and therefore is described briefly for simplicity. For related parts, reference can be made to descriptions in the method implementation. The described apparatus implementation is merely an example. The units described as separate parts may or may not be physically separate, and parts displayed as units may or may not be physical units, can be located in one position, or can be distributed on a plurality of network units. Part or all of the modules can be selected based on actual needs to achieve the objectives of the solutions of the present application. A person of ordinary skill in the art can understand and implement the implementations of the present application without creative efforts.

The foregoing descriptions are merely examples of the implementations of the present application, but are not intended to limit the present application. Any modification, equivalent replacement, or improvement made without departing from the spirit and principle of the present application shall fall within the protection scope of the present application.

Figure 6:
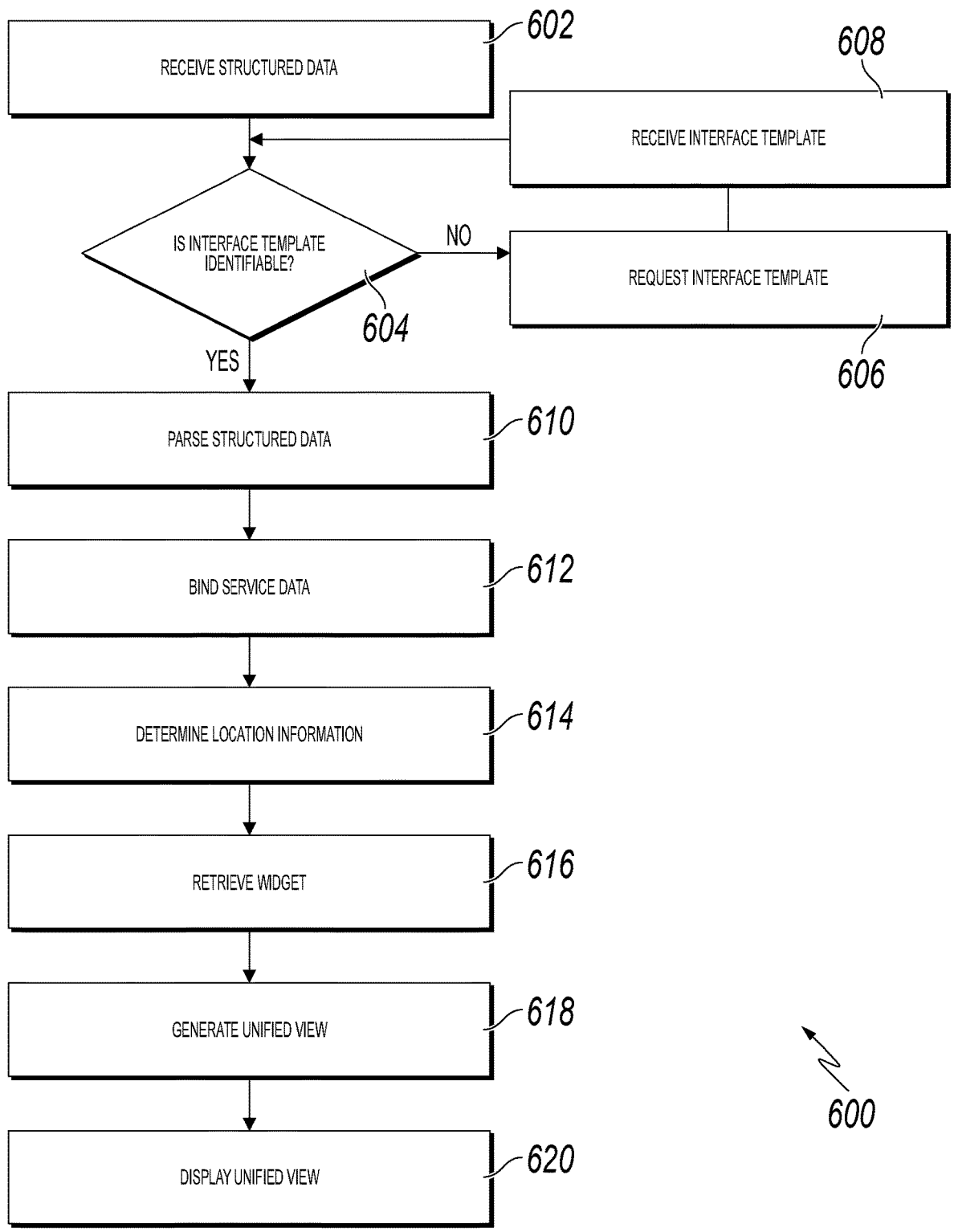
FIG. 6 is a flowchart illustrating an example of a computer-implemented method for generating a view of a graphical user interface according to an implementation of the present disclosure.

FIG. 6 is a flowchart illustrating an example of a computer-implemented method 600 for generating a unified view of a graphical user interface, according to an implementation of the present disclosure. For clarity of presentation, the description that follows generally describes method 600 in the context of the other figures in this description. However, it will be understood that method 600 can be performed, for example, by any system, environment, software, and hardware, or a combination of systems, environments, software, and hardware, as appropriate. In some implementations, various steps of method 600 can be run in parallel, in combination, in loops, or in any order.

At 602, structured data of an interface template is received by a client device from a server. The structured data can be generated by the server by parsing an interface template data of the interface template. The interface template data can include a tag describing a widget. The widget is a visual component included in a graphical user interface. The widget can be described by using the common tag, for example, a Body tag, a Div tag, a Title tag, a Label tag, and an Img tag. The widget can include an element that presents a display style. In some implementations, the display style can be implemented by using Cascading Style Sheets (CSS). The layout can be specified by using CSS for an interface written in HTML. Javascript (JS) can be used to control display content, display effects, layout relationship adjustment of the common tags, and to process user's operations. The structured data can be written in a general protocol markup language. The structured data can include a first syntax tree with a format simpler than a second syntax tree of the interface template data such that the processing efficiency of the client device is improved. For example, the general protocol markup language can be HyperText Markup Language (HTML), and the structured data can be JavaScript Object Notation (JSON) data or Extensible Markup Language (XML) data. In some implementations, the format of the structured data is selected based on computational resources to save network resources, and minimize computational costs of the client device. For example, the format of the structured data (first syntax tree) can be selected to optimize processing efficiency of the client device considering that the client device can have a smaller processing capacity than the server. The server can select a particular format type of the structured data that is compatible and can be optimally processed by a particular type of client device including a particular processor and memory configuration. From 602, method 600 proceeds to 604.

At 604, the interface template is identified based on an interface identifier included in the service data. In response to determining that the interface template is not identifiable, from 604, method 600 proceeds to 606.

At 606, a request is generated, for the server, to transmit the interface template that corresponds to the service data. From 606, method 600 proceeds to 608.

At 608, the interface template that corresponds to the service data is received from the server and can be stored in a data storage accessible by the client device. From 608, method 600 returns to 604. In response to identifying the interface template, from 604, method 600 proceeds to 610.

At 610, the structured data is parsed into component parameters that are used to generate a tree-structure including multiple virtual view nodes. The information stored in each virtual view node includes information related to the tag, a type of a corresponding client application, and/or a response event information associated with the corresponded client application. From 610, method 600 proceeds to 612.

At 612, the service data is bound to the virtual view node by inserting the service data in the corresponding virtual view node by using an entry function. For example, a JS engine of the client device can search for the JSON data of the corresponding interface template based on the interface template ID, and transmits the service data to a JS entry function of the interface template for processing. The JS entry function splits the service data and then inserts the service data into the corresponding virtual view node for binding. For example, a service data related to a Body tag is bound to a virtual view node that stores the Body tag, and a service data related to a Div tag is bound to a virtual view node that stores the Div tag. From 612, method 600 proceeds to 614.

At 614, a location information of the widget corresponding to each virtual view node is determined based on the information included in the respective virtual view node that the service data is bound to. From 614, method 600 proceeds to 616.

At 616, widgets are retrieved based on the location information of the widget. In some implementations, at least a portion of the widgets are retrieved in parallel to decrease the widget retrieval time. The number of the widgets that are retrieved in parallel can be maximized based on the processing bandwidth of the client device. From 616, method 600 proceeds to 618.

At 618, a unified view of a graphical user interface is generated by rendering the widget with a plurality of widgets associated with the graphical user interface. The rendering engine of the client device can be configured to trigger the process of rendering the view in association with the widget retrieval. For example, the widgets can be rendered based on retrieval time, such that widgets are added to the view (and presented to the user) based on the order in which they are received (e.g., one by one). As another example, if all the widgets are retrieved from the memory in parallel, the widgets can be rendered together into the view, and the complete unified view is presented to the user, such that the rendering time can be greatly reduced. From 618, method 600 proceeds to 620.

At 620, the unified view of the graphical user interface is displayed on a display device. In some implementations, in response to displaying the unified view of the graphical user interface a user input is received requesting a service procedure. The user input, can generate a trigger for a service procedure, which is transmitted to the server to update the interface template. The server can be configured to perform the service procedure to update the interface template. The server can generate and send the updated interface template and a second structured data of the updated interface template to the client device. From 620, method 600 stops.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method executed by one or more processors, the method comprising:

receiving, by a client application from a server, JavaScript Object Notation (JSON) data corresponding to an interface template, the interface template being separate from the client application, wherein the JSON data is generated by the server by parsing Hypertext Markup Language of interface template data associated with the interface template, wherein the JSON data is written in a general protocol markup language comprising a syntax tree that is simpler than the syntax tree of the Hypertext Markup Language of the interface template data, wherein the JSON data contains data corresponding to the Hypertext Markup Language of the interface template data comprising a plurality of tags each describing a respective widget, wherein each widget is a visual component included in a graphical user interface containing a plurality of widgets corresponding to the interface template;

identifying, by the client application, the interface template based on a first interface identifier included in the received data, wherein each interface template has a unique interface identifier to distinguish between different interface templates;

in response to identifying the interface template, determining, by the client application, a document object model node for each widget based on the JSON data, wherein each document object model node stores information related to each respective tag, and wherein each document object model node comprises location information of each respective widget in the interface template described by a respective tag;

parsing, by the client application, the JSON data into a tree structure of virtual view nodes for storing information for a plurality of document object model nodes of the interface template, each virtual view node storing a respective document object model node and at least one virtual view node comprising response event information associated with the client application;

retrieving, by a client application from the server, service data during a service data exchange procedure, wherein the service data contains a second interface identifier, wherein the service data contains service data for binding with a first virtual view node of the plurality of virtual view nodes;

searching, by the client application, for an interface template that corresponds to the second interface identifier;

in response to locating the searched for interface template, identifying the located interface template as the searched for interface template without initiating a server request;

in response to failing to locate the searched for interface template:

requesting, by the client application, a structured data of an updated interface template that corresponds to the second interface identifier from the server;

receiving, by the client application, the structured data of the updated interface template corresponding to the second interface identifier and instructing the first virtual view node to update its stored document object model node information based on the received structured data;

identifying the updated interface template as the searched for interface template;

after identifying the searched for interface template, binding, by the client application, the service data to the first virtual view node by using an entry function;

determining, by the client application, location information of a widget based on the information stored in the first virtual view node;

retrieving, by the client application, the widget based on the location information;

generating, by the client application, a unified view of the graphical user interface comprising rendering the widget with the plurality of widgets associated with the graphical user interface; and displaying, by the client application, the unified view of the graphical user interface on a display device.

2. The method of claim 1, wherein information stored in the first virtual view node comprises information related to a tag and a type of a corresponding application.

3. The method of claim 1, wherein updating the information stored in the first virtual view node comprises redrawing the unified view of the graphical user interface.

4. The method of claim 3, wherein receiving the service data comprises invoking attributes and methods in native code.

5. A non-transitory, computer-readable medium storing one or more instructions executable by a computer system to perform operations comprising:

receiving, by a client application from a server, JavaScript Object Notation (JSON) data corresponding to an interface template, the interface template being separate from the client application, wherein the JSON data is generated by the server by parsing Hypertext Markup Language of interface template data associated with the interface template, wherein the JSON data is written in a general protocol markup language comprising a syntax tree that is simpler than the syntax tree of the Hypertext Markup Language of the interface template data, and wherein the JSON data contains data corresponding to the Hypertext Markup Language of the interface template data comprising a plurality of tags each describing a respective widget, wherein each widget is a visual component included in a graphical user interface containing a plurality of widgets corresponding to the interface template;

identifying the interface template based on a first interface identifier included in the received data, wherein each interface template has a unique interface identifier to distinguish between different interface templates;

in response to identifying the interface template, determining a document object model node for each widget based on the JSON data, wherein each document object model node stores information related to each respective tag, and wherein each document object model node comprises location information of each respective widget in the interface template described by a respective tag;

parsing the JSON data into a tree structure of virtual view nodes for storing information for a plurality of document object model nodes of the interface template, each virtual view node storing a respective document object model node and at least one virtual view node comprising response event information associated with the client application;

retrieving, by a client application from the server, service data during a service data exchange procedure, wherein the service data contains a second interface identifier, wherein the service data contains service data for binding with a first virtual view node of the plurality of virtual view nodes;

searching, by the client application, for an interface template that corresponds to the second interface identifier;

in response to locating the searched for interface template, identifying the located interface template as the searched for interface template without initiating a server request;

in response to failing to locate the searched for interface template:

requesting a structured data of an updated interface template that corresponds to the second interface identifier from the server;

receiving the structured data of the updated interface template corresponding to the second interface identifier and instructing the first virtual view node to update its stored document object model node information based on the received structured data;

identifying the updated interface template as the searched for interface template after identifying the searched for interface template, binding, by the client application, the service data to the first virtual view node by using an entry function;

determining location information of a widget based on the information stored in the first virtual view node;

retrieving the widget based on the location information;

generating a unified view of the graphical user interface comprising rendering the widget with the plurality of widgets associated with the graphical user interface; and displaying the unified view of the graphical user interface on a display device.

6. The non-transitory, computer-readable medium of claim 5, wherein information stored in the first virtual view node comprises information related to a tag and a type of a corresponding client application.

7. The non-transitory, computer-readable medium of claim 5, wherein updating the information stored in the first virtual view node comprises redrawing the unified view of the graphical user interface and wherein triggering the service data exchange procedure comprises invoking attributes and methods in native code.

8. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, by a client application from a server, JavaScript Object Notation (JSON) data corresponding to an interface template, the interface template being separate from the client application, wherein the JSON data is generated by the server by parsing Hypertext Markup Language of interface template data associated with the interface template, wherein the JSON data is written in a general protocol markup language comprising a syntax tree that is simpler than the syntax tree of the Hypertext Markup Language of the interface template data, wherein the JSON data contains data corresponding to the Hypertext Markup Language of the interface template data comprising a plurality of tags each describing a respective widget, wherein each widget is a visual component included in a graphical user interface containing a plurality of widgets corresponding to the interface template;
identifying the interface template based on a first interlace identifier included in the received data, wherein each interface template has a unique interlace identifier to distinguish between different interface templates;
in response to identifying the interface template, determining a document object model node for each widget based on the JSON data, wherein each document object model node stores information related to each respective tag, and wherein each document object model node comprises location information of each respective widget in the interface template described by a respective tag;
parsing, by the client application the JSON data into a tree structure of virtual view nodes for storing information for a plurality of document object model nodes of the interface template, each virtual view node storing a respective document object model node and at least one virtual view node comprising response event information associated with the client application;
retrieving by a client application from the server service data during a service data exchange procedure, wherein the service data contains a second interface identifier, wherein the service data contains service data for binding with a first virtual view node of the plurality of the virtual view nodes;
searching, by the client application, for an interface template that corresponds to the second interface identifier;
in response to locating the searched for interface template, identifying the located interface template as the searched for interface template without initiating a server request;
in response to failing to locate the searched for interface template:
requesting, by the client application, a structured data of an updated interface template that corresponds to the second interface identifier from the server;
receiving the structured data of the updated interface template corresponding to the second interface template identifier and instructing the first virtual view node to update its stored document object model node information based on the received structured data;
identifying the updated interface template as the searched for interface template;
after identifying the searched for interface template, binding, by the client application, the service data to the first virtual view node by using an entry function;
determining location information of the widget based on the information stored in the first virtual view node;
retrieving the widget based on the location information;
generating a unified view of the graphical user interface comprising rendering the widget with the plurality of widgets associated with the graphical user interface; and
displaying the unified view of the graphical user interface on a display device.

9. The computer-implemented system of claim 8, wherein information stored in the first virtual view node comprises information related to a tag and a type of a corresponding client application.

10. The computer-implemented system of claim 8, wherein updating the information stored in the first virtual view node comprises redrawing the unified view of the graphical user interface and wherein triggering the service data exchange procedure comprises invoking attributes and methods in native code.

* * * * *